(12) United States Patent
Bridgers

(10) Patent No.: US 10,713,083 B2
(45) Date of Patent: *Jul. 14, 2020

(54) EFFICIENT VIRTUAL I/O ADDRESS TRANSLATION

(71) Applicant: Altera Corporation, San Jose, CA (US)

(72) Inventor: Kenneth Vincent Bridgers, Austin, TX (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,356

(22) Filed: Feb. 4, 2019

(65) Prior Publication Data

US 2019/0243675 A1    Aug. 8, 2019

Related U.S. Application Data

(63) Continuation of application No. 14/873,007, filed on Oct. 1, 2015, now Pat. No. 10,216,533.

(51) Int. Cl.
*G06F 13/36* (2006.01)
*G06F 9/455* (2018.01)
(Continued)

(52) U.S. Cl.
CPC ........ *G06F 9/45558* (2013.01); *G06F 9/5016* (2013.01); *G06F 12/109* (2013.01);
(Continued)

(58) Field of Classification Search
None
See application file for complete search history.

(56) References Cited

U.S. PATENT DOCUMENTS

| 7,506,084 | B2 | 3/2009 | Moerti et al. |
| 7,620,753 | B1 * | 11/2009 | Beaman ................ G06F 9/526 710/52 |
| 7,734,842 | B2 | 6/2010 | Arndt et al. |
| 8,769,168 | B2 | 7/2014 | Moertl et al. |
| 2002/0169938 | A1 | 11/2002 | Scott et al. |
| 2003/0033481 | A1 | 2/2003 | Hass et al. |

(Continued)

FOREIGN PATENT DOCUMENTS

| CN | 102650976 A | 8/2012 |
| WO | 2014036004 A1 | 3/2014 |

OTHER PUBLICATIONS

Kutch, Patrick, PCI-SIG SR-IOV Primer An Introduction to SR-IOV Technology Intel® LAN Access Division, Jan. 2011, 321211-002, Revision 2.5, Intel Corporation, 28 pgs.

(Continued)

*Primary Examiner* — Henry Tsai
*Assistant Examiner* — Dean Phan
(74) *Attorney, Agent, or Firm* — Fletcher Yoder P.C.

(57) ABSTRACT

A method includes using a network interface controller to monitor a transmit ring, wherein the transmit ring comprises a circular ring data structure that stores descriptors, wherein a descriptor describes data and comprises a guest bus address that provides a virtual memory location of the data. The method also includes using the network interface controller to determine that a descriptor has been written to the transmit ring. The method further includes using the network interface controller to attempt to retrieve a translation for the guest bus address. The method includes using the network interface controller to read the descriptor from the transmit ring.

20 Claims, 7 Drawing Sheets

(51) Int. Cl.
  *G06F 12/1045* (2016.01)
  *G06F 9/50* (2006.01)
  *G06F 12/1081* (2016.01)
  *G06F 12/109* (2016.01)
  *G06F 13/40* (2006.01)
  *G06F 13/42* (2006.01)
  *G06F 15/17* (2006.01)
  *G06F 15/78* (2006.01)

(52) U.S. Cl.
  CPC ...... *G06F 12/1045* (2013.01); *G06F 12/1081* (2013.01); *G06F 13/404* (2013.01); *G06F 13/4022* (2013.01); *G06F 13/4282* (2013.01); *G06F 15/17* (2013.01); *G06F 15/781* (2013.01); *G06F 2009/45579* (2013.01); *G06F 2212/1024* (2013.01); *G06F 2212/151* (2013.01)

(56) References Cited

U.S. PATENT DOCUMENTS

| | | |
|---|---|---|
| 2006/0236011 A1 | 10/2006 | Narad et al. |
| 2008/0091915 A1 | 4/2008 | Moertl et al. |
| 2011/0029734 A1 | 2/2011 | Pope et al. |
| 2011/0153909 A1 | 6/2011 | Dong |
| 2014/0281055 A1* | 9/2014 | Davda ................ G06F 12/1081 710/26 |
| 2015/0127763 A1 | 5/2015 | Pope et al. |

OTHER PUBLICATIONS

Extended EP Search Report for EP Application No. 16191770 dated Apr. 4, 2017.
First Office Action for CN Application No. 201610876727.5 dated Aug. 5, 2019, 28 pages.
Second Office Action for CN Application No. 201610876727.5 dated Apr. 26, 2020.

\* cited by examiner

EFFICIENT VIRTUAL I/O ADDRESS TRANSLATION

CROSS REFERENCE TO RELATED APPLICATIONS

This application is a continuation of U.S. patent application Ser. No. 14/873,007, entitled "Efficient Virtual I/O Address Translation," filed Oct. 1, 2015, which is hereby incorporated by reference in its entirety for all purposes.

BACKGROUND

The present disclosure relates generally to virtual machines, such as virtual machines supported by an operating system. More particularly, the present disclosure relates to providing efficient virtual input/output (I/O) address translation for network interface devices within a virtual machine.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A high-performance server network may use virtual machine architecture hosted by a hypervisor. Virtual machines may in turn use virtual memory addresses that are mapped to physical memory addresses to more efficiently use memory space. A memory management unit in a host system may translate the virtual addresses to the physical addresses. The high-performance server network may also use a high-performance network interface device, such as a network interface controller (NIC). When transmitting and receiving data, the data may be transferred between the host system and the NIC. To read outgoing data sent from the host system or write incoming data to the host system, the NIC may request translation of the virtual addresses to access the desired physical addresses. These translation requests may incur latency that may negatively affect network performance.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems and methods for enhancing network performance of a high-performance server network by using a directed input/output (I/O) support technology. In particular, the present embodiments relate to a high-performance network interface device, such as a network interface controller (NIC), using the directed I/O support technology by accessing untranslated, virtual "guest" bus addresses from virtual machines hosted by a hypervisor and translating the guest bus addresses at opportune times. The NIC may initiate memory transactions with the untranslated guest bus addresses, which results in an I/O fault and a request for translation. Requesting translations at opportune times using the capabilities provided by the directed I/O support technology may reduce or eliminate the latency incurred as a result from initiating memory transactions with the untranslated guest bus addresses.

In a first embodiment, a method includes using a network interface controller to monitor a transmit ring, wherein the transmit ring comprises a circular ring data structure that stores descriptors, wherein a descriptor describes data and comprises a guest bus address that provides a virtual memory location of the data. The method also includes using the network interface controller to determine that a descriptor has been written to the transmit ring. The method further includes using a network interface controller to attempt to retrieve a translation for the guest bus address. The method includes using a network interface controller to read the descriptor from the transmit ring.

In a second embodiment, a method includes using a network interface controller to monitoring a receive ring, wherein the receive ring comprises a circular ring data structure that stores descriptors, wherein a descriptor describes data and comprises a guest bus address that provides a virtual memory location of the data. The method also includes using the network interface controller to determine that a descriptor has been written to the receive ring. The method further includes using the network interface controller to attempt to retrieve a translation for the guest bus address. The method includes using the network interface controller to read the descriptor from the receive ring.

In a third embodiment, a tangible, non-transitory, machine-readable-medium includes machine-readable instructions to monitor a circular ring data structure that stores descriptors, wherein a descriptor describes data and comprises a guest bus address that provides a virtual memory location of the data. The machine-readable-medium also includes machine-readable instructions to determine that the descriptor has been written to the circular ring data structure. The machine-readable-medium further includes machine-readable instructions to determine when a translation for the guest bus address has been cached. The machine-readable-medium includes machine-readable instructions to read the translation when the translation has been determined to have been cached. The machine-readable-medium also includes machine-readable instructions to request the translation for the guest bus address when the translation has not been determined to have been cached. The machine-readable-medium further includes machine-readable instructions to read the descriptor from the circular ring data structure.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to optimizing virtual input/output (I/O) address translation for network interface devices, such as a network interface controller (NIC), within a virtual machine. In particular, the present embodiments relate to the NIC using the directed I/O support technology by accessing untranslated, virtual "guest" bus addresses from the virtual machines hosted by the hypervisor and translating the guest bus addresses at opportune times. The term "guest" in the present disclosure refers to the virtual machines that are installed on the host operating system and that run on a virtualization platform of the host operating system. Guest bus addresses are virtual memory addresses that are mapped to physical memory addresses of the host system. A processor of the host system may map noncontiguous physical memory (e.g., from a variety of different sources, such as a memory of the host processor, a memory of a hard disk, etc.) to a contiguous virtual address space—the virtual memory. Additionally, software of the host system may extend memory capabilities to provide a virtual address space that can exceed the capacity of the physical memory of the host system, and thus reference more memory than may be physically present on the host system. Address translation hardware of the processor may translate the guest bus addresses to physical addresses to access stored data. The NIC may initiate memory transactions with the untranslated guest bus addresses, which results in an I/O fault and a request for translation. Requesting translations at opportune times using the capabilities provided by the directed I/O support technology may reduce or eliminate the latency incurred as a result from initiating memory transactions with the untranslated guest bus addresses.

Figure 1:
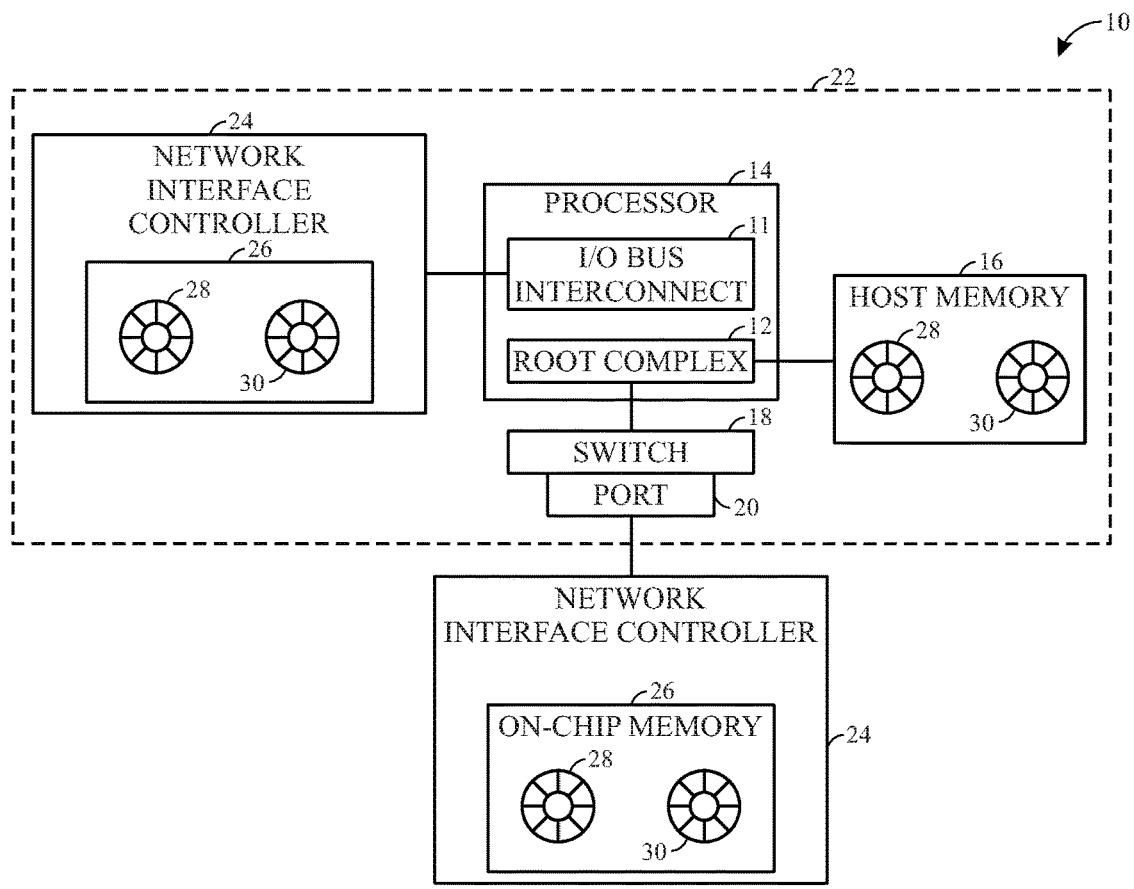
FIG. 1 is a block diagram illustrating a system that includes an internal input/output (I/O) bus interconnect in accordance with an embodiment.

With the foregoing in mind, FIG. 1 is a block diagram illustrating a system 10 that includes an internal I/O bus interconnect 11 in accordance with an embodiment. The I/O bus interconnect 11 may use a high-speed serial computer expansion bus standard that supports directed I/O support technology, such as Peripheral Component Interconnect Express (PCIe) 3.0 or later, Intel QuickPath Interconnect (QPI), etc. For example, PCIe 3.0 supports single root I/O virtualization (SR-IOV). The system 10 may include a host system 22. The host system 22 may include a processor 14, a host memory 16, a root complex 12, and one or more switches 18 that provide one or more connection points 20 (e.g., PCIe 3.0 ports). The root complex 12 may connect the processor 14 and the host memory 16 to the one or more switches 18 of the system 10. The host memory 16 may include a physical random access memory (RAM) of the system 10. The host memory 16 may include memory allocated to a transmit ring 28 and a receive ring 30 used by either and/or both of the NICs 24 to process data packets. The root complex 12 may generate transaction requests on behalf of the processor 14. The root complex 12 may be a discrete device or integrated with the processor 14. The root complex 12 may include the one or more switches 18 that provide the one or more connection points 20 (e.g., PCIe 3.0 ports). The system 10 may further include NICs 24. In some embodiments, the host system 22 may include NIC 24, which may be coupled to the processor 14 via the I/O bus interconnect 11. It should be understood that the processor 14 of the host system 22 may include one or more processors that perform the tasks and share the structure of the processor 14. In some embodiments, NIC 24 may be coupled to the switch 18 by the port 20. NIC 24 may include an on-chip memory 26. The on-chip memory 26 may include memory allocated to the transmit ring 28 and the receive ring 30 used by the host system 22 and the NIC 24 to process data packets. The on-chip memory 26 may include a copy of data stored in the host memory 16. For example, the transmit ring 28 and the receive ring 30 of the on-chip memory 26 may include a copy of the data stored in the transmit ring 28 and the receive ring 30 of the host memory 16. In some embodiments, the on-chip memory 26 may include a copy of descriptors stored in the host memory 16.

Figure 2:
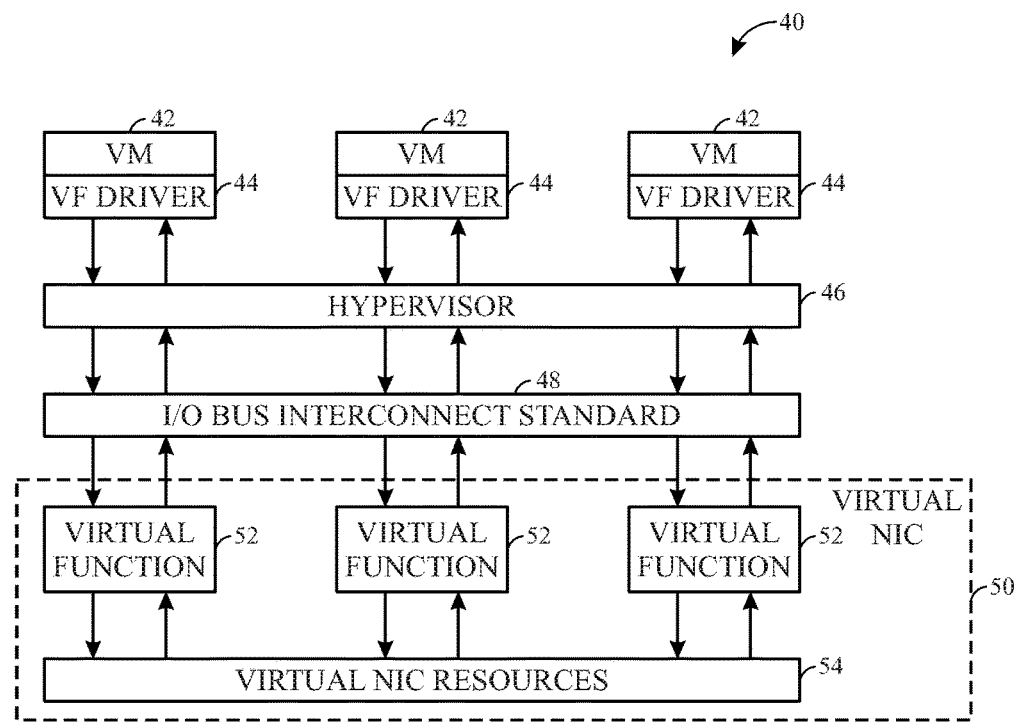
FIG. 2 is a block diagram illustrating a software system that uses an internal I/O bus interconnect standard that supports directed I/O support technology in accordance with an embodiment.

Turning now to a virtual machine architecture applicable to the system 10, FIG. 2 is a block diagram illustrating a software system 40 that uses an I/O bus interconnect standard that supports directed I/O support technology in accordance with an embodiment. The software system 40 may include one or more virtual machines (VMs) or guest machines 42. Each VM 42 has a virtual function (VF) driver 44 that provides an interface to the NIC 24. The software system 40 may also include a hypervisor or virtual machine monitor 46 that creates and runs the VMs 42. The software system uses an I/O bus interconnect standard (e.g., a high-speed serial computer expansion bus standard) 48 that supports directed I/O support technology that enables access to devices such as the NIC 24. For example, the I/O bus interconnect standard 48 may use PCIe 3.0 or later, Intel QPI, etc. In particular, PCIe 3.0 supports single root I/O virtualization (SR-IOV). SR-IOV may enable a single device that is connected to the switch 18, such as the NIC 24, to appear to be multiple separate devices. In particular, the software system may expose the NIC 24 as a virtual NIC 50 to each of the VMs 42. SR-IOV may also enable the VMs 42 to access resources within the NIC 24, via virtual functions 52. The VMs 42 may see these resources as virtual NIC resources 54. This functionality may be observed with Windows, Linux and other variations of these operating systems (e.g., frameworks provided by Intel Data Plane Development Kit (DPDK), VMWare, Xen, etc.).

Figure 3:
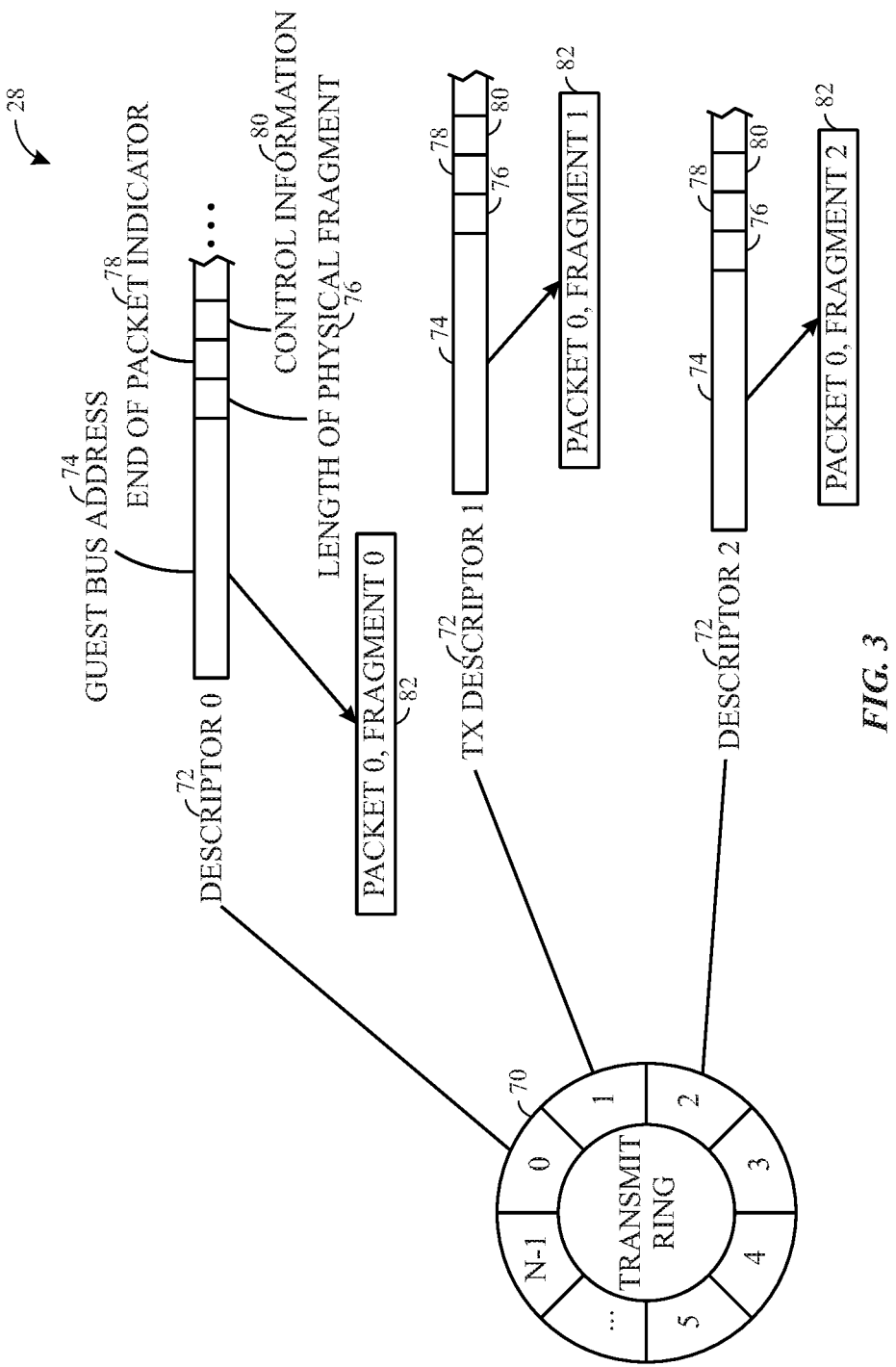
FIG. 3 is a diagram illustrating a transmit ring in accordance with an embodiment.

As noted above, the host memory 16 or the on-chip memory 26 of the NIC 24 may include the transmit ring 28. FIG. 3 is a diagram illustrating the transmit ring 28 in accordance with an embodiment. The transmit ring 28 may be used by the NIC 24 to process packets formatted by the VF driver 44. The transmit ring 28 is a data structure that uses a single, fixed-size buffer as if it were connected end-to-end, such as a circular ring. The transmit ring 28 includes entries 70 numbered 0 to n−1, wherein each entry 70 contains a descriptor 72 that describes a physical fragment 82 of data in memory for a packet of data. That is, the packet may be made up of the one or more fragments 82. For example, packet 0 may be made up of the fragments 0, 1, and 2. The descriptor 72 may include a guest bus address 74 that is the virtual location of the fragment 82. The descriptor 72 may further include, inter alia, information relevant to the fragment 82 (e.g., length of physical fragment 76), information relevant to the packet (e.g., end of packet indicator 78), and control information 80.

Figure 4:
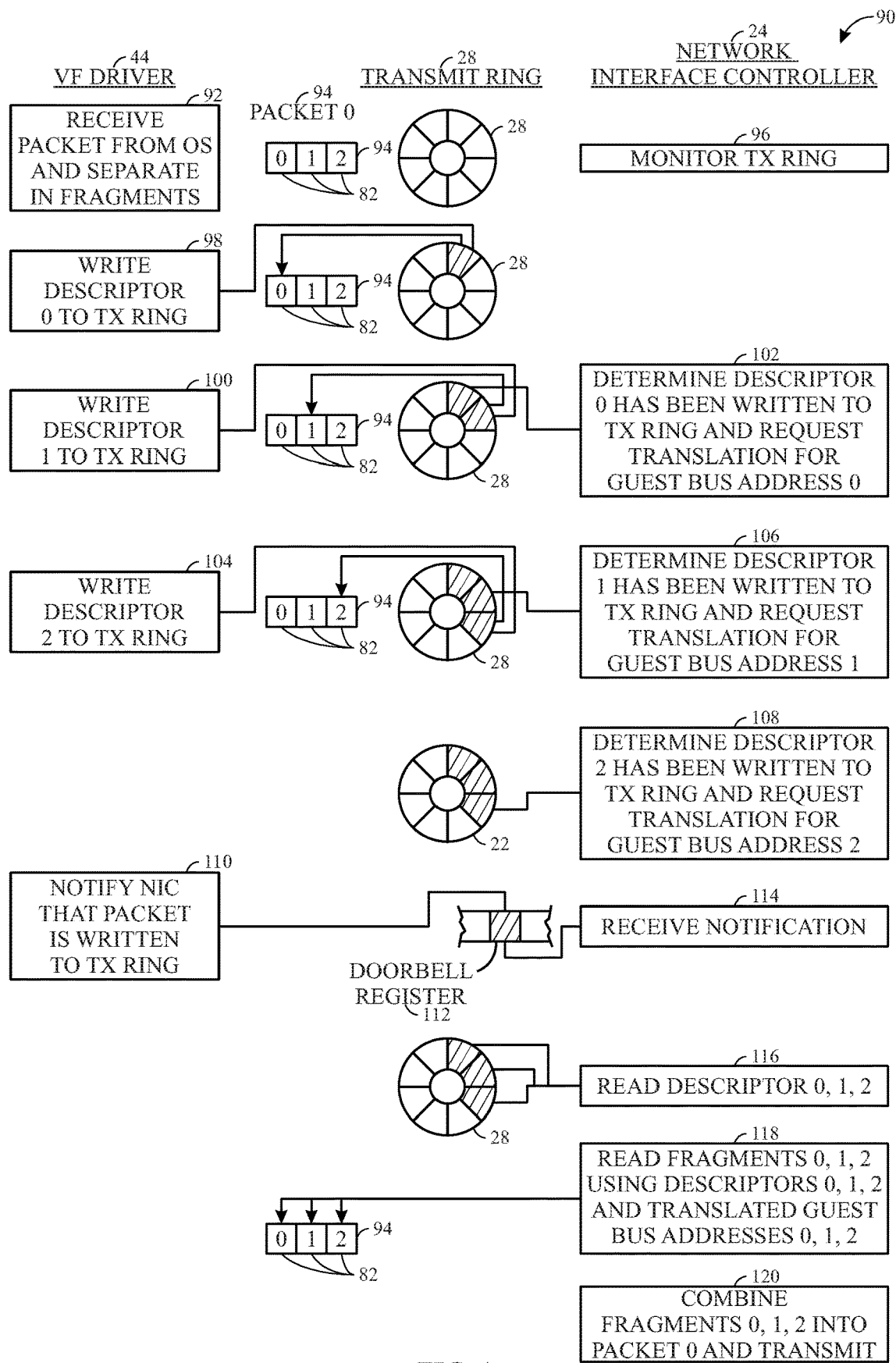
FIG. 4 is a diagram illustrating a process of transmitting data in accordance with an embodiment.

Turning to the process of transmitting data, a guest operating system (OS) of the VM 42 may provide one or more packets to be transmitted in a single call to the VF driver 44. FIG. 4 is a diagram illustrating the process 90 of transmitting data in accordance with an embodiment. The VF driver 44 may receive (block 92) the packet 94 from the guest OS and separate the packet 94 into fragments 82. Alternatively, the VF driver 44 may receive the fragments 82 that have been separated from the packet 94 by the guest OS. In the illustrated example, packet 0 is made up of three fragments, 0, 1, and 2. During this time, the NIC 24 is monitoring (block 96) the transmit ring 28 for descriptors 72 (shown in FIG. 3) written by the VF Driver 44. The NIC 24 has the ability to monitor the transmit ring 28 that is stored on the host memory 16 by using, for example, Address Translation Services (ATS), provided by SR-IOV. In particular, ATS enables the VM 42 to perform direct memory access (DMA) transactions to and from a PCIe device (e.g., the NIC 24) by using look-up tables to map the virtual address to the corresponding physical address. ATS also enables the PCIe device to perform DMA transactions to the VM 42 in the same manner. If the transmit ring 28 is stored on the on-chip memory 26 in the NIC 24, the NIC 24 may access the transmit ring 28 without performing DMA transactions.

The VF driver 44 may write (block 98) descriptor 0 (shown in FIG. 3) to a first entry 70 in the transmit ring 28. As depicted in FIG. 3, descriptor 0 may include, inter alia, the guest bus address 74 that is the virtual location of fragment 0 that makes up packet 0. During this time, the NIC 24 continues monitoring (block 96) the transmit ring 28 for new descriptors 72. The VF driver 44 may write (block 100) descriptor 1 to a second entry 70 in the transmit ring 28. Descriptor 1 may include, inter alia, the guest bus address 74 that is the virtual location of fragment 1 of packet 0. Approximately at this time, the NIC 24 may determine (block 102) that descriptor 0 has been written to the transmit ring 28. In that case, the NIC 24 may attempt to retrieve and/or request a translation for guest bus address 0 (i.e., the guest bus address 74 contained in descriptor 0). The NIC 24 may eventually receive the translated physical address for guest bus address 0. The VF driver 44 may write (block 104) descriptor 2 to a third entry 70 in the transmit ring 28. Descriptor 2 may include, inter alia, the guest bus address 74 that is the virtual location of fragment 2 of packet 0. Approximately at this time, the NIC 24 may determine (block 106) that descriptor 1 has been written to the transmit ring 28. In that case, the NIC 24 may request a translation for guest bus address 1 (i.e., the guest bus address 74 contained in descriptor 1). The NIC 24 may further determine (block 108) that descriptor 2 has been written to the transmit ring 28. In that case, the NIC 24 may request a translation for guest bus address 2 (i.e., the guest bus address 74 contained in descriptor 2). The NIC 24 may eventually receive the translated physical address for guest bus address 2.

Once the three descriptors 0, 1, and 2 are written to the transmit ring 28, the VF driver 44 may notify (block 110) the NIC 24 by writing in the doorbell register 112 of the NIC 24. The doorbell register 112 is a register of the NIC 24 that enables software (e.g., the VF driver 44) to write to the register such that the NIC 24 is notified that one or more packets have been written to the transmit ring 28. After the NIC 24 receives (block 114) the notification from the VF driver 44, the NIC 24 may read (block 116) descriptors 0, 1, and 2 from the transmit ring 28. Alternatively, the NIC 24 may determine that it has received the translated physical addresses for guest bus addresses 0, 1, and 2 before reading 116 descriptors 0, 1, and 2 from the transmit ring 28. The NIC 24 may then read 118 fragments 0, 1, and 2 using the information in the descriptors 0, 1, and 2 in conjunction with the translated physical addresses for guest bus address 0, 1, and 2. The NIC 24 may combine 120 fragments 0, 1, and 2 into packet 0, and transmit packet 0.

As mentioned briefly above, the NIC 24 may initiate memory transactions with the untranslated guest bus addresses, resulting in an I/O fault and a request for translation. In the case where the process 90 of transmitting data results in one or more guest bus addresses 74 remaining untranslated, initiating the memory transaction with the untranslated bus address 74 may still occur. However, the process 90 of transmitting data as described above may reduce or eliminate the latency incurred as a result from initiating the memory transactions with the untranslated guest bus addresses 74.

Additionally, some embodiments may use an address translation caching feature of the directed I/O support technology to further improve latency and overall performance characteristic of the process 90 of transmitting data. For example, PCIe supports an Address Translation Cache (ATC) feature to cache and reuse address translations. This may be especially useful for common guest bus addresses 74 that are repeatedly used.

Figure 5:
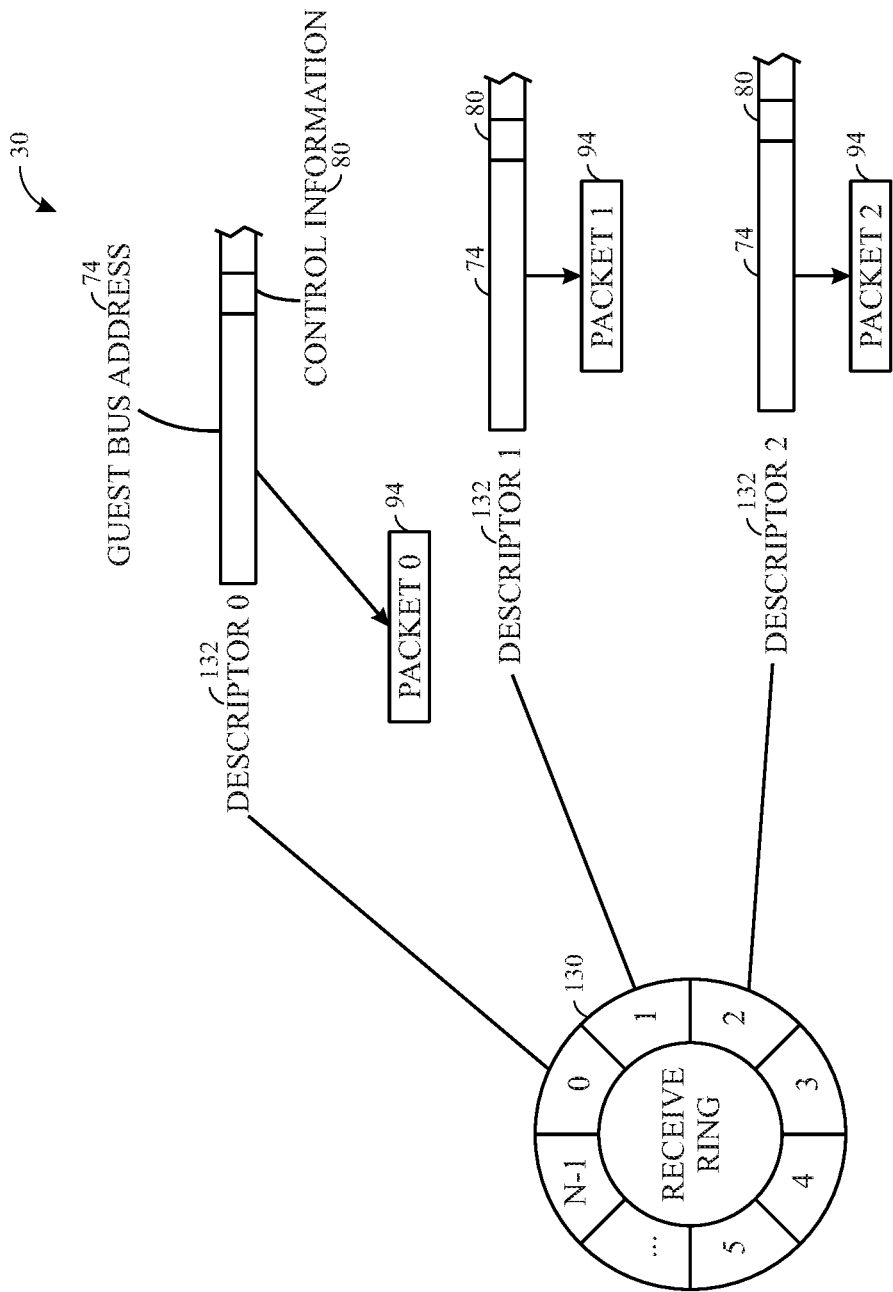
FIG. 5 is a diagram illustrating a receive ring in accordance with an embodiment.

As noted above, the host memory 16 or the on-chip memory 26 of the NIC 24 may also include the receive ring 30. FIG. 5 is a diagram illustrating the receive ring 30 in accordance with an embodiment. The receive ring 30 may be used by the VF driver 44 to provide receive buffers to the NIC 24. The receive ring 28 is a data structure that uses a single, fixed-size buffer as if it were connected end-to-end, such as a circular ring. The receive ring 30 includes entries 130 numbered 0 to n−1, wherein each entry 130 contains a descriptor 132 that describes a complete packet 94 of data. The descriptor 132 may include the guest bus address 74 that is the virtual location of the receive buffer designated to store the packet 94. The descriptor 132 may further include, inter alia, control information 80.

Figure 6:
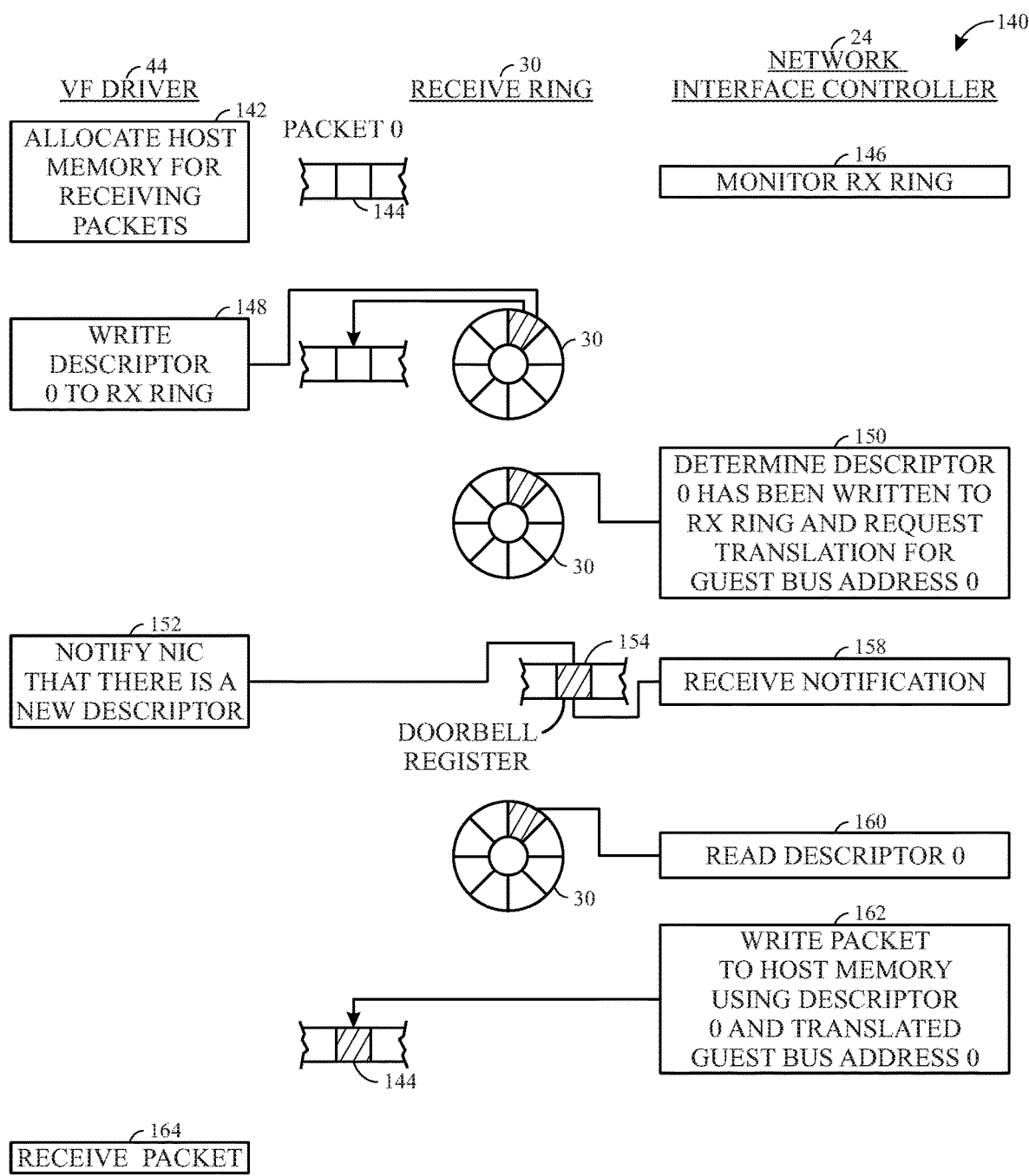
FIG. 6 is a diagram illustrating a process of receiving data in accordance with an embodiment.

FIG. 6 is a diagram illustrating the process 140 of receiving data in accordance with an embodiment. The VF driver 44 may allocate (block 142) host memory 16 for receiving data. In particular, the VF driver 44 may allocate host memory 16 as receive buffers 144 for receiving incoming packets 94. During this time, the NIC 24 is monitoring (block 146) the receive ring 30 for new descriptors 132 (shown in FIG. 5) written by the VF Driver 44. The NIC 24 has the ability to monitor the receive ring 30 stored on the host memory 16 by using ATS, provided by SR-IOV. In particular, ATS enables the VM 42 to perform DMA transactions to and from a PCIe device (e.g., the NIC 24) by using look-up tables to map the virtual address to the corresponding physical address. ATS also enables the PCIe device to perform DMA transactions to the VM 42 in the same manner. If the receive ring 30 is stored on the on-chip memory 26 in the NIC 24, the NIC 24 may access the receive ring 30 without performing DMA transactions.

The VF driver 44 may write (block 148) descriptor 0 to a first entry 130 in the receive ring 30. As depicted in FIG. 5, descriptor 0 may include, inter alia, the guest bus address 74 that is the virtual location of the receive buffer designated to store packet 0. During this time, the NIC 24 continues monitoring (block 146) the receive ring 30 for new descriptors 132. Approximately at this time, the NIC 24 may determine (block 150) that the descriptor 0 has been written to the receive ring 30. In that case, the NIC 24 may attempt to retrieve and/or request a translation for guest bus address 0 (i.e., the guest bus address 74 contained in descriptor 0). The NIC 24 may eventually receive the translated physical address for guest bus address 0.

Once descriptor 0 is written to the receive ring 30, the VF driver 44 may notify (block 152) the NIC 24 by writing in the doorbell register 154 of the NIC 24. The doorbell register 154 is a register of the NIC 24 that enables software (e.g., the VF driver 44) to write to the register such that the NIC 24 is notified that one or more packets have been written to the receive ring 30. After the NIC 24 receives (block 156) the notification from the VF driver 44, the NIC 24 may read (block 158) descriptor 0 from the receive ring 30. Alternatively, the NIC 24 may determine that it has received the translated physical addresses for the guest bus addresses 74 before reading (block 158) descriptor 0 from the receive ring 30. When an incoming packet 94 arrives (block 160) at the NIC 24, the NIC 24 may write (block 162) the packet 94 to the receive buffer 144 allocated in host memory 16 for receiving the incoming packet 94. The VF driver 44 thus receives (block 164) the incoming packet 94.

As discussed above, the NIC 24 may initiate memory transactions with the untranslated guest bus addresses, which may result in an I/O fault and a request for translation. In the case where the process 140 of receiving data results in one or more guest bus addresses 74 remaining untranslated, initiating the memory transaction with the untranslated bus address 74 may still occur. However, it is envisioned that the process 140 of transmitting data as described above may reduce or eliminate the latency incurred as a result from initiating the memory transactions with the untranslated guest bus addresses 74.

Additionally, some embodiments may use an address translation caching feature of the directed I/O support technology to further improve latency and overall performance characteristic of the process 140 of receiving data. For example, PCIe supports the ATC feature to cache and reuse address translations. This may be especially useful for common guest bus addresses 74 that are repeatedly used.

Figure 7:
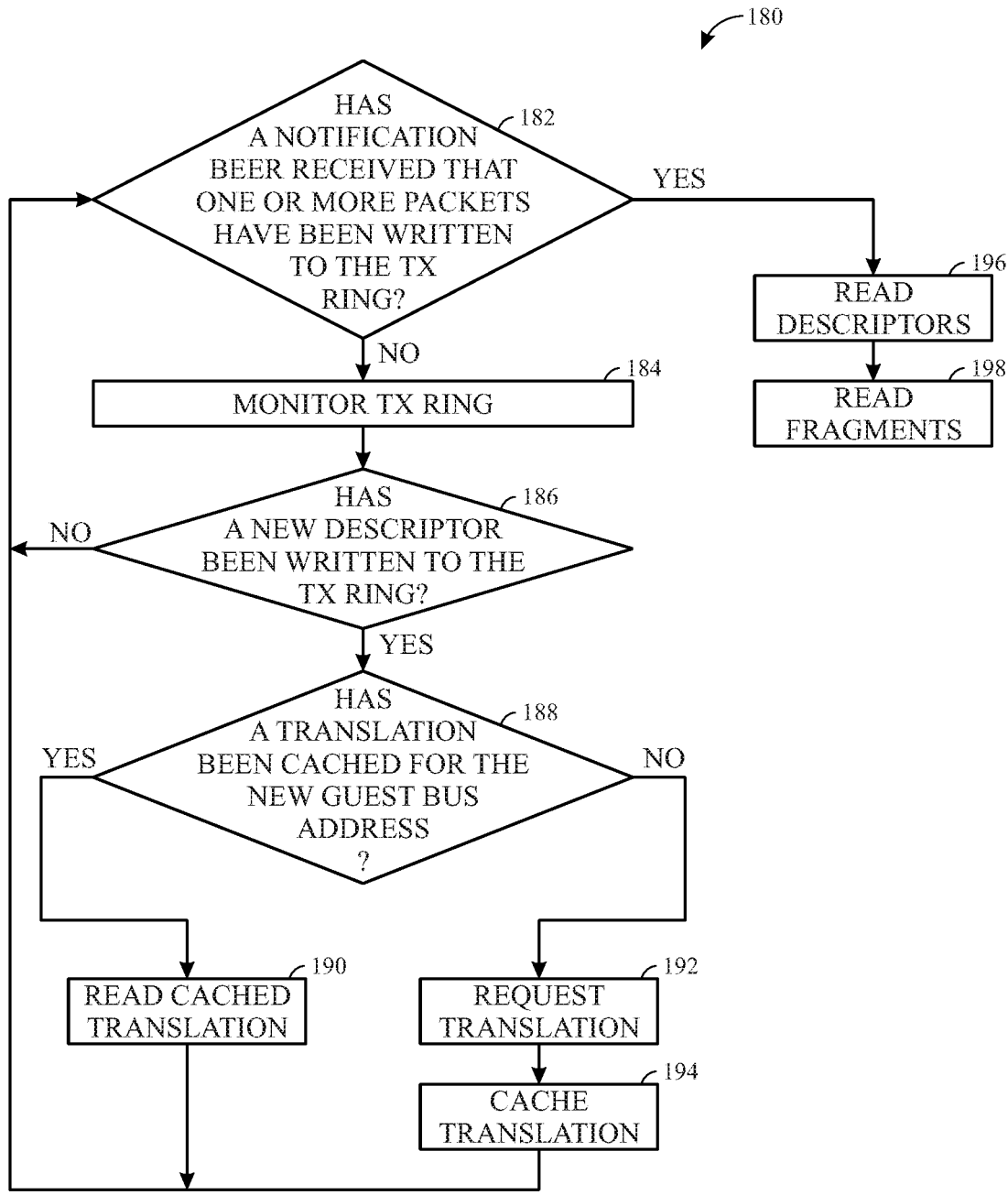
FIG. 7 is a flow chart illustrating a method of transmitting data in accordance with an embodiment.

Turning now to FIG. 7, a flow chart that illustrates a method 180 of transmitting data in accordance with an embodiment. The NIC 24 may determine (node 182) whether a notification has been received from the VF driver 44 that one or more packets 94 have been written to the transmit ring 28. If the NIC 24 determines that the notification has not been received, the NIC 24 may monitor (block 184) the transmit ring 28 for new descriptors 72. The NIC 24 has the ability to monitor the transmit ring 28 stored on the host memory 16 by using ATS, provided by SR-IOV. In particular, ATS enables the VM 42 to perform direct memory access (DMA) transactions to and from a PCIe device (e.g., the NIC 24) by using look-up tables to map the virtual address to the corresponding physical address. ATS also enables the PCIe device to perform DMA transactions to the VM 42 in the same manner. If the transmit ring 28 is stored on the on-chip memory 26 in the NIC 24, the NIC 24 may access the transmit ring 28 without performing DMA transactions.

The NIC 24 may determine (node 186) whether a new descriptor 72 has been written to the transmit ring 28. If not, the method 180 may return to node 182. If the NIC 24 determines that a new descriptor 72 has been written to the transmit ring 28, the NIC 24 may then determine (node 188) whether a translation has been cached for a guest bus address 74 of the new descriptor 72. If so, the NIC 24 may read (block 190) the cached translation for the guest bus address 74 and the method 180 may continue to node 182. If the translation has not been cached for the guest bus address 74, the NIC 24 may attempt to retrieve and/or request (block 192) a translation for the guest bus address 74. The NIC 24 may then cache (block 194) the translation for the guest bus address 74. In some embodiments, the NIC 24 may only cache the translation for the guest bus address 74 if the address is determined to be a common guest bus address 74 that may be repeatedly used. In some embodiments, the NIC 24 may only cache the translation for the guest bus address 74 only after it has been determined that there is a threshold amount of memory resources to allow for caching the translation of the guest bus address 74. The method 180 may then continue to node 182.

If the NIC 24 determines (node 182) that the notification from the VF driver 44 that one or more packets 94 have been written to the transmit ring 28 has been received, the NIC 24 may read (block 196) the descriptors 72 in the transmit ring 28. The NIC 24 may then read (block 198) fragments of data located at the guest bus addresses 74. For those guest bus addresses 74 that remain untranslated, the read operation may result in an I/O fault, followed by an attempt to retrieve and/or a request for translation of the untranslated guest bus address 74. This may incur latency that may negatively impact network performance. No additional latency is incurred for the guest bus addresses 74 that have already been translated because they were translated at opportune times, e.g., while the VF driver 44 was processing one or more packets into the transmit ring 28.

Figure 8:
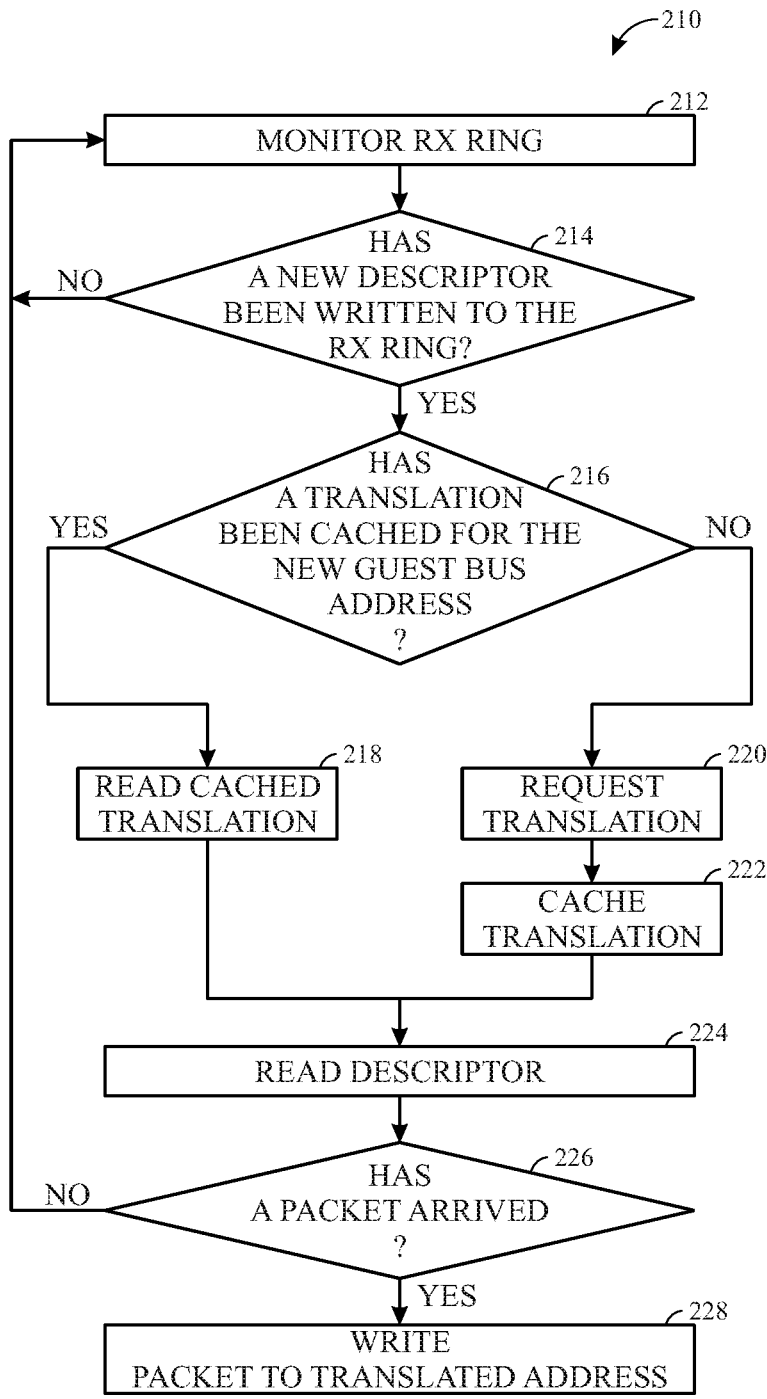
FIG. 8 is a flow chart illustrating a method of receiving data in accordance with an embodiment.

Turning now to FIG. 8, a flow chart illustrating a method 210 of receiving data in accordance with an embodiment. The NIC 24 may monitor (block 212) the receive ring 30 for new descriptors 132. The NIC 24 has the ability to monitor the receive ring 30 stored on the host memory 16 by using ATS, provided by SR-IOV. In particular, ATS enables the VM 42 to perform direct memory access (DMA) transactions to and from a PCIe device (e.g., the NIC 24) by using look-up tables to map the virtual address to the corresponding physical address. ATS also enables the PCIe device to perform DMA transactions to the VM 42 in the same manner. If the receive ring 30 is stored on the on-chip memory 26 in the NIC 24, the NIC 24 may access the receive ring 30 without performing DMA transactions.

The NIC 24 may determine (node 214) whether a new descriptor 132 has been written to the receive ring 30. If not, the method 210 may return to block 212. If the NIC 24 determines that a new descriptor 132 has been written to the receive ring 30, the NIC 24 may then determine (node 216) whether a translation has been cached for a guest bus address 74 of the new descriptor 132. If so, the NIC 24 may read (block 218) the cached translation for the guest bus address 74 and the method 180 may continue to block 224. If the translation has not been cached for the guest bus address 74, the NIC 24 may attempt to retrieve and/or request (block 220) a translation for the guest bus address 74. The NIC 24 may then cache (block 222) the translation for the guest bus address 74. In some embodiments, the NIC 24 may only cache the translation for the guest bus address 74 if the address is determined to be a common guest bus address 74 that may be repeatedly used. In some embodiments, the NIC 24 may only cache the translation for the guest bus address 74 only after it has been determined that there is a threshold amount of memory resources to allow for caching the translation of the guest bus address 74. The method 180 may then continue to block 224.

The NIC 24 may then read (block 224) the new descriptor 132. The NIC 24 may determine (node 226) whether a packet 94 has arrived. If not, the method may return to block 212 and continues to monitor the receive ring 30 for new descriptors 132. If the NIC 24 has determined that the packet 94 has arrived, the NIC 24 may write (block 228) the packet to the translated guest bus address. Performing translations of the guest bus addresses 74 at opportune times, e.g., while the VF driver 44 is writing descriptors to the receive ring 30 or notifying the NIC 24 that there is a new descriptor 132 in the receive ring 30 prior to the arrival of the packet 94, may eliminate the latency incurred resulting from requesting translations after the descriptor 132 is read or after the packet 94 arrives, thus enhancing network performance.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method, comprising using a network interface controller to:
    monitor a transmit ring, wherein the transmit ring comprises a circular ring data structure that stores a first descriptor and a second descriptor associated with a packet of data, wherein the first descriptor and the second descriptor describe data comprising a respective first guest bus address and a second guest bus address that provide a respective first virtual memory location and a second virtual memory location of the data, where in the first descriptor and the second descriptor are written to the transmit ring;
    determine that the first descriptor has been written to the transmit ring;
    request a first translation for the first guest bus address while the second descriptor is written to the transmit ring in response to determining that the first descriptor has been written;
    retrieve the first translation for the first guest bus address;
    determine that the second descriptor has been written to the transmit ring;
    request a second translation for the second guest bus address;
    retrieve the second translation for the second guest bus address; and
    read the first descriptor and the second descriptor from the transmit ring using the first translation for the first guest bus address and the second translation for the second guest bus address.

2. The method of claim 1, wherein the first descriptor describes a first fragment of the packet of data, wherein the second descriptor describes a second fragment of the packet of data.

3. The method of claim 2, wherein the first guest bus address provides the first virtual memory location of the first fragment of the packet of data, wherein the second guest bus address provides the second virtual memory location of the second fragment of the packet of data.

4. The method of claim 1, comprising using the network interface to monitor the transmit ring for new descriptors associated with fragments of the packet of data.

5. The method of claim 1, wherein the transmit ring is stored on a host memory.

6. The method of claim 1, wherein retrieving the first translation for the first guest bus address comprises:
    determining whether the first translation for the first guest bus address has been cached;
    reading the first translation from a cache in response to determining that the first translation has been cached; and
    requesting the first translation for the first guest bus address in response to determining that the first translation has not been cached.

7. A network interface controller configured to:
    determine a first descriptor of a plurality of descriptors associated with a data packet has been written to a receive ring;
    request a first translation for a first guest bus address of the first descriptor while a second descriptor is written to the receive ring in response to determining that the first descriptor has been written;
    retrieve the first translation for the first guest bus address of the first descriptor in the receive ring;
    determine that the second descriptor of the plurality of descriptors is written to the receive ring;
    request a second translation for a second guest bus address of the second descriptor, wherein the first guest bus address and the second guest bus address provide a respective first virtual memory location and a second virtual memory location of the data;
    retrieve the second translation for the second guest bus address; and
    read the plurality of descriptors from the receive ring using the first translation for the first guest bus address and the second translation for the second guest bus address.

8. The network interface controller of claim 7, communicatively coupled to a virtual function driver that is configured to write the second descriptor to the receive ring.

9. The network interface controller of claim 8, configured to appear as multiple separate devices to the virtual function driver.

10. The network interface controller of claim 7, comprising a memory, wherein the receive ring is stored on the memory.

11. The network interface controller of claim 7, wherein the first descriptor describes a first fragment of a packet of data, wherein the second descriptor describes a second fragment of the packet of data.

12. The network interface controller of claim 11, wherein retrieving the first translation occurs before receiving a notification that the packet of data has been written to the receive ring.

13. The network interface controller of claim 7, comprising initiating a memory transaction with an untranslated guest bus address in response to failing to retrieve the first translation.

14. A tangible, non-transitory, machine-readable-medium, comprising machine-readable instructions that, when executed by a network interface controller, cause the network interface controller to:
   determine a first descriptor associated with a packet of data has been written to a circular ring data structure;
   determine a first translation for a first guest bus address of the first descriptor has been cached in parallel with a second descriptor associated with the packet of data being written to the circular ring data structure in response to determining that the first descriptor has been written;
   read the first translation when the first translation has been cached;
   request the first translation for the first guest bus address when the first translation has not been cached in response to determining that the first descriptor has been;
   determine the second descriptor has been written to the circular ring data structure;
   request a second translation for a second guest bus address of the second descriptor, wherein the first guest bus address and the second guest bus address provide a respective first virtual memory location and a second virtual memory location of the data;
   retrieve the second translation for the second guest bus address; and
   read the first descriptor and the second descriptor from the circular ring data structure using the first translation for the first guest bus address and the second translation for the second guest bus address.

15. The machine-readable-medium of claim 14, comprising machine-readable instructions that cause the network interface controller to initiate a memory transaction with an untranslated first guest bus address in response to not receiving the first translation.

16. The machine-readable-medium of claim 14, wherein the first descriptor describes a first fragment of the packet of data, wherein the second descriptor describes a second fragment of the packet of data.

17. The machine-readable-medium of claim 16, comprising machine-readable instructions that cause the network interface controller to receive a notification that the packet of data has been written to the circular ring data structure after reading or requesting the first translation and the second translation.

18. The machine-readable-medium of claim 14, comprising machine-readable instructions that cause the network interface controller to cache the translated first guest bus address.

19. The method of claim 1, comprising using the network interface controller to receive a notification indicating that a plurality of descriptors associated with the packet of data have been written to the transmit ring, wherein the plurality of descriptors comprise the first descriptor and the second descriptor.

20. The method of claim 19, wherein using the network interface controller to read the first descriptor and the second descriptor from the transmit ring occurs in response to receiving the notification.

* * * * *